United States Patent Office 3,741,944
Patented June 26, 1973

3,741,944
POLYMERIC REACTION PRODUCT OF A DITHIOL WITH 2,2' - ALKYLENEBIS - 2-OXAZOLINE OR OXAZINE
Donald A. Tomalia, Midland, Mich., assignor to The Dow Chemical Company, Midland, Mich.
No Drawing. Application Jan. 28, 1971, Ser. No. 110,752, which is a division of application Ser. No. 833,765, June 16, 1969, now Patent No. 3,639,395. Divided and this application Feb. 8, 1972, Ser. No. 224,617
Int. Cl. C08g 23/00
U.S. Cl. 260—79    1 Claim

ABSTRACT OF THE DISCLOSURE

A polymeric material composed of repeating units of the formula

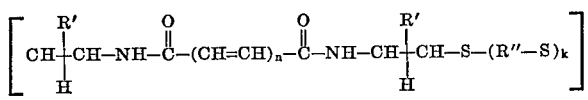

where R' is hydrogen or alkyl of from 1 to 4 carbon atoms, $n$ is an integer from 1 to 3, R" is of the scope of R' or cycloalkylene of from 4 to 7 carbon atoms or substituted cycloalkylene of from 5 to 12 carbon atoms or phenyl, and $k$ is an integer greater than 1.

The polymeric material, when in liquid form, is adapted to be used as a curing agent to cure polyepoxides to obtain epoxy resins.

---

This is a division of application Ser. No. 110,752, filed Jan. 28, 1971 which is a division of application Ser. No. 833,765 filed June 16, 1969, now Pat. No. 3,639,395.

BACKGROUND OF THE INVENTION

Field of the invention

The polyepoxides that can be cured to obtain epoxy resins are well known as are many curing agents, some of them latent, in the sense that they initiate a cure so slowly as to be negligible or nearly so, until the curable mixture is heated. The diheterocyclic compounds of this invention are curing agents of unusual latency, for polyepoxides. They also participate readily in a wide range of other reactions that lead to polymeric resins.

The prior art

Feinauer et al., 698 Annalen 174 (1966) have shown the reaction between certain monooxazolines and monoepoxides to produce various 1 - aza - 4,6 - dioxa - bicyclo-[3.3.0]octane compounds.

Numerous systems for the curing of polyepoxides are known in the art; by reference, there are incorporated here chapters 5 through 13 of "Handbook of Epoxy Resins" (McGraw Hill, New York, 1967) by Lee and Neville, wherein general and particular discussion of the curing of epoxy resins is presented. U.S. Pat. 2,924,571 purports to show the preparation of various 2,2'-alkylene bis 2-oxazolines by the benzene azeotroping of water from a mixture of dicarboxylic acid and amino ethanol. The present inventors have reinvestigated the work set forth in the said patent and have found that while the processes there set forth, employing the stated starting materials, lead to products having (so far as the present inventors know) at least some and perhaps all of the useful properties imputed to them, nevertheless, the structures and names assigned to the supposed products of the patent are consistently erroneous. One reading the patent would believe himself led to the preparation of an alkylene bisoxazoline compound, whereas, in fact, following the procedures of the patent one obtains, at best, a mixture of 2-hydroxyethyl amide and certain polyesteramide substances. The patent does not enable the preparation of any oxazoline. Recognizing the significance of their imputation of error, the present applicants have scrupulously verified, and have proved, the error in the prior art patent.

Kagiya and co-workers (4 Polymer Letters 257) (1966) have reported the preparation of 2,2'-alkylene or p-arylene bis-2-oxazolines by the reaction of 1,1'-alkylene or arylene-dicarbonyl bisdiaziridines with acetonitrile in the presence of sodium iodide.

Various monooxazoline compounds have been shown to be capable of homopolymerization under such influence as catalytic boron trifluoride: see Tomalia et al., 4 Journal of Polymer Science, 2253 (1966). W. Seeliger et al., Edit. 5 Angew. Chem. internat., 875 (1966). Synthetic routes have been summarized by Wiley et al., 44 Chem. Revs., 447–475. Other recent synthetic developments as well as various polymerizations are reported by Seeliger et al. Edit. 5 Angew. Chem. internat. 875 (1966).

DESCRIPTION OF THE PRESENT INVENTION

The present invention provides biheterocyclic compounds in which the heterocyclic rings are of five or six ring atoms and are represented, generically, by the formula

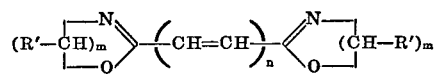

in which R' represents hydrogen or alkyl of from 1 to 4, both inclusive, carbon atoms, $m$ represents an integer, 2 or 3, and $n$ represents an integer from 1 to 3, both inclusive.

The compounds homopolymerize under cationic catalytic influence to yield highly cross-linked homopolymers that result from opening of the heterocyclic rings. Such polymer is of the general unit structure

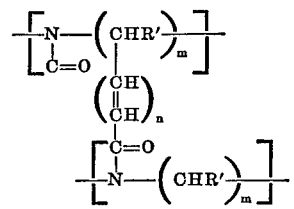

Alternatively, or in addition, the present compounds can be caused to polymerize ethylenically at the site of the ethylenic linkage.

Further, by the activity of the oxazoline or oxazine ring, the instant compounds react with and bring about cure of a curable polyepoxide to obtain an epoxy resin. As polymers of the instant compounds are, in general, terminated with a heterocycle of the instant compounds, such polymers are also curing agents for epoxy resins.

The cure of a polyepoxide takes either or both of two forms; by breaking of the carbon-nitrogen double bond without ring opening, the heterocycles of this invention fuse with at least some of the oxirane rings of a curable polyepoxide to yield a product of the structure

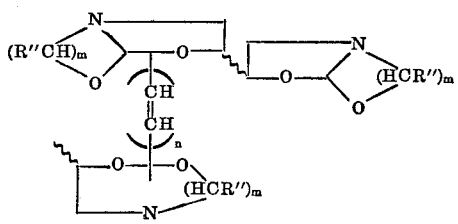

wherein the undulatory linkage represents the structure of a curable polyepoxide through which oxirane rings are linked together: other symbols have the meaning hereinbefore set forth.

However, the recurring fused ring moiety

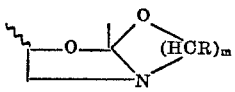

in some way acts catalytically to induce the cure of a polyepoxide by opening of the oxirane ring and the setting up of cross-linking etherification, in the manner customary of such polyepoxide in becoming a cured epoxy resin.

Moreover, the oxazine or oxazoline ring is capable of reaction with a mercapto group to give rise to a structure of the polyamide type generally represented by the formula

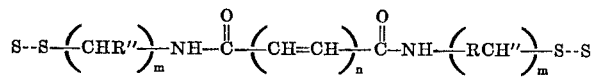

in which the broken line represents the nuclear structure of a dithiol starting material.

Instead of a dithiol, hydrogen sulfide or a polythiol can be used. With hydrogen sulfide, the polyamide is of the general formula

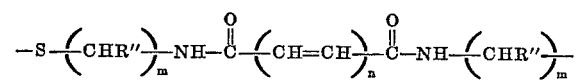

whereas with a polythiol above a dithiol there takes place the cross-linking of amide structures with multiple branching from the polythiol nucleus.

PREPARATION OF THE PRESENT COMPOUNDS

The bisalkenyl oxazoline and oxazine compounds of this invention are all easily produced by any of a group of synthetic routes all of which pass, advantageously, through a cyano group; in the sense that, at each molecular site where an oxazine or oxazoline heterocyclic is desired, there is provided, as a precursor site, a cyano. From such site it is, in general, convenient and easy to go on to the desired heterocycle. The only condition believed to be limiting at this juncture is that, with respect to the reactions that go on from the cyano to the heterocycle, preferably the cyano be the most reactive or only significantly reactive site; or, if any other site on the starting cyano compound be more reactive than cyano, then known alternative procedures must be considered.

It is not difficult, and in the laboratory work carried out in the completion of the instant invention, it has become routine, to prepare the instant compounds with elegance and high purity. However, it is pointed out that for at least their reactivity as monomers and comonomers and curing agents, such elegance is not required. Mixed starting materials can be used to give mixed products all within the single class, or genus, of such compounds as hereinbefore set forth, all will function as indicated. Stoichiometry of starting materials can be permitted to vary in such fashion that substantially more, or somewhat fewer, average, oxazine or oxazoline heterocycles appear, per molecule, than precisely two as above indicated; and for at least their reactivity as monomers and comonomers and curing agents, all will function as indicated. Similarly, the position isomery of substituents (but not within the nuclear structure of the oxazine or oxazoline moieties) may vary widely without impairing the products of this invention.

Many synthetic routes are known by which to provide reactive cyano sites as desired. Reference is here made, to incorporate the Mowry review in 42 Chemical Reviews 189–283. Methods there set forth in detail suffice to prepare any cyano compounds needed herein as starting materials.

From the cyano compound which in some structures can be classified as a nitrile, various routes to the instant oxazoline or oxazine structures are available. Each involves a first acyclic substitution at the cyano sites followed by a cyclizing reaction. Whether the resulting heterocycle is an oxazoline (5-membered) or oxazine (6-membered) ring will be determined by the chain length and structure of the acyclic substituent and is in each case entirely optional with the synthesis chemist. In many applications where the sole criterion to be met is that according to this invention there be provided a superior curing agent for an epoxy resin or a superior comonomer, mixtures of oxazolines and oxazines will be a as satisfactory as, or in some applications, more satisfactory than, compounds of high individual purity.

The most forthright route, procedurally, involves reactions of a mechanism which, when set out in detail, appears complicated; but procedures remain simple. This route involves causing a reaction of the cyano compound precursor with a loweralkylene chlorohydrin in the presence of hydrogen chloride, and upon the completion of that reaction, cyclizing the resulting intermediate with a substance, usually a base, which is an acceptor for the elements of hydrogen halide, such as triethylamine, trimethylamine, or an alkali metal hydroxide. With ethylene chlorohydrin (2-chloroethanol) this procedure leads to the oxazolines whilst with trimethylene chlorohydrin, (3-chloro-1-propanol) it leads to the oxazines: and with a mixture of chlorohydrins, a mixture of heterocycles.

Alternative to the foregoing, yet starting from the cyano structure, a group of related synthetic routes proceeds by a first oxidation of the cyano to the carboxyl, as in the presence of sulfuric acid and under protonating conditions. Upon completion of the conversion to the carboxyl form, the resulting intermediate is then converted to the acyl halide, such as the chloride, in one convenient method this conversion is brought about by reaction of the carboxyl compound with thionyl chloride. Acyl halides other than the chloride are available; and can be used.

From the acyl halide form, various optional routes proceed. The acyl chloride reacts readily with aziridine (ethyleneimine) to obtain an intermediate which, in turn, in the presence of basic hydrogen chloride acceptor, cyclizes to the desired oxazoline structure.

Similarly, azetidines are used. The unsubstituted material is not well known to the present inventors, but numerous azetidines in which the heterocyclic ring has been stabilized by substituents give good results. In general, substituents on the carbon atoms of azetidines appear in the final oxazine products as substituents upon the corresponding carbon atoms.

From the acyl halide, another synthetic route requires reaction of the acyl halide with an amino alcohol, to produce an acyclic intermediate which, from the amino alcohol, is hydroxyl terminated and which, under moderate conditions of dehydration, gives the desired cyclic compound. The identity of the cyclic compound is determined by the number of linear carbon atoms between the hydroxyl and the amino groups. If two, the product is an oxazoline. If three, the product is an oxazine: if a mixture, a mixed product results. In another method a diacyl chloride of an unsaturated dicarboxylic acid is reacted, at near 0° C. and absent water, with aziridine under conditions for the aceptance of the elements of hydrogen chloride, to produce the corresponding bis acylaziridine. Excess exotherm is to be avoided.

The bisacylaziridine is then taken up in dry acetone, together with sodium iodide catalyst, and is refluxed over several hours to rearrange the acylaziridine to obtain the bisoxazoline.

The cyclizing reactions in which precursor substances are converted into the oxazoline compounds of the present invention are, in general exothermic and, in general, they do not require extreme conditions to be initiated. As such cyclizing reactions go forward, there is at least some tendency for competing reactions to take place in which, in a manner that has not been fully studied, polymeric substances appear to be formed. Such polymeric substances tend to be gummy or weakly resinous substances and of no presently recognized value, and are not desired.

Higher temperatures favor the production of such polymeric substances, and, accordingly, it will oftentimes be desired to maintain reaction temperatures as low as is convenient. Accordingly, the addition of cyclizing agent will oftentimes be carried out slowly, portionwise, and with the resulting reaction mixture cooled or chilled.

Good results are usually obtained when the cyclizing reaction according to the present invention is carried out at a temperature between —30° C. and +40° C. Within this range, at or beyond the lower limit the cyclizing reaction goes forward very slowly; above the upper limit competing and probably polymerizing reactions go forward at such rate as to be wasteful. A preferred temperature range will vary somewhat according to the precise identity of the precursor substance to be cyclized and also according to the identity of the cyclizing agent; but, in general, a cyclizing reaction temperature of 0 to +10° C. will be preferred. When such temperatures are employed, however, it may at times be advantageous to drive the last aspects of the reaction to completion by the application of moderate heat or at least the removal of cooling for a terminal interval of reaction time.

The reaction can be carried out in the absence of liquid reaction medium. However, there is considerable tendency for employed materials, especially very pure materials, to crystallize; in this condition, the orderly procedure of the cyclizing reaction may be inhibited, and it will usually be desired to prevent or diminish crystallization by the addition of some liquid solvent that is inert to the reaction that is taking place, whereby to maintain an entire reaction mixture in the liquid phase until reactions are substantially complete. Solvent can be chosen for such volatility that it is thereafter readily stripped away.

The precise relationship between the amount of reactant to be cyclized and the capacity of the vessel in which cyclization is carried out is not critical. In general, the inventory of starting material and the capacity of the vessel in which cyclization is to be carried out should be such that good, thorough, prompt, and complete agitation, such as stirring is convenient.

In general, the atmosphere within the vessel in which cyclization takes place is not critical and may be air. It may also be air saturated with vapors of a volatile solvent. When cyclodehydrohalogenating, as in the instance of a chloroalkylamide or chloroalkylamidate, skilled chemists will at once recognize that the ambient atmosphere must not be richly supplied with hydrogen halide from outside source, since it would compete in the cyclizing reaction.

The starting amide or amidate compound to be cyclized can be obtained as an article of commerce and supplied as an existing entity to the reaction vessel. Alternatively, and conveniently, when desired, the starting material that is to be cyclized can be prepared in the same vessel in which it is subsequently cyclized, such preparation taking place immediately or shortly prior to the cyclization reaction if desired. The reaction conditions necessary to prepare the chloroalkylamide or amidate or the hydroxyalkylamide are closely similar to those employed in the cyclization, and such in situ preparation may be preferred.

Upon the completion of the synthesis of compounds according to this invention, work-up, that is to say, the separation and sufficient purification of the resulting products is not difficult. Most advantageous procedures will be determined upon the basis of the exact preparatory procedures observed. Thus, when hydrogen halide acceptor reacting with the elements of hydrogen halide obtains a water-soluble product, the entire reaction vessel contents can be, if desired, mixed with water and thoroughly stirred to wash the reaction vesel contents; typically, the resulting mixture separates promptly into an aqueous and an organic layer, product being predominantly in the organic layer.

Distillation can be employed to separate and purify product according to this invention, and the bulk of material necessary to be distilled can sometimes be reduced by such prior water washing.

Crude or partially purified product sometimes gives evidence that the desired product of the invention is a solid. In such instance, vacuum distillation is often of use in purification of product; but also, it is at times useful to take crude product up in and recrystallize it from solvent. At least in laboratory quantities, ordinary solvents give good results, such as a mixture of four parts diethyl ether and one part acetone by volume. Isopropanol is also at times used with good results to obtain a recrystallized solid product.

THE USES OF THE PRESENT INVENTION

The bioxazoline or bioxazine compounds of this invention homopolymerize under protonic catalytic influence to give self polymers that are useful as plastics. Any of various catalysts can be used. One convenient and very effective catalyst is the boron trifluoride adduct of the monomer. A monomer of this invention usually takes up boron trifluoride in qauntity sufficient that it can be used in very dilute form with unmodified monomer to catalyze the polymerization. When a 1:1 molar $BF_3$-monomer adduct is formed, as is often the case, one mole percent of it in a mixture to be polymerized is usually sufficient to catalyze the polymerization. It can, if desired, be prepared in situ by passing gaseous $BF_3$ over the surface of a stirred monomer composition. If prepared other than in situ it is to be maintained dry and out of contact with oxygen.

The catalyzed bioxazoline compound or mixture of such compounds polymerizes promptly upon being heated. The resulting polymers, absent plasticizing agents, are glassy, hard, and of colour represented by that of the unpolymerized material. They are highly crosslinked and manifest the thermoset and insolubility properties characteristic of crosslinked polymers.

In another embodiment, a mono-oxazoline compound of the prior art (see Tomalia et al., cited above) is mixed in, as comonomer, with a cross linking proportion of a bioxazoline or bioxazine compound of this invention, and the resulting mixture is catalyzed, as above, and heated to obtain a copolymer of the oxazoline and bioxazoline compounds. The relative abundance of the two kinds of monomer is adjusted to give a product of desired extent of cross linking. Manipulative procedures are as those set forth above for the homopolymers.

Each embodiment of the foregoing described products of the present invention is useful as a reactive curing agent to cure a curable polyepoxide to obtain an epoxy resin. In this use, it is not necessary to produce the products of this invention with a high degree of purity in such matters as position isomery; or whether highly purified oxazines or oxazolines. Mixed products of this invention together with modest amounts of naturally occurring side products are of value and in some instances may be preferred, in the curing of polyepoxides.

For such use, the present diheterocyclic compounds bring the extraordinary advantage that, though highly effective as co-reactive curing agents, they can be mixed with the curable polyepoxide in advance and left together with it over prolonged periods of time without cure of the epoxy, provided only that the mixture be protected from curing temperatures, namely, temperatures in excess of about 100° C.

For one embodiment of such application, the amount of oxazine or oxazoline compound to be employed is calculated upon the basis that, in the curing reaction, one oxazine or oxazoline ring can react with one oxirane ring, and the reactants are to be supplied in quantities such that about this relative proportion of the substances is supplied. Good results are obtained when polyepoxide is supplied in an amount in modest excess of that required for exact stoichiometric cure.

When either or both materials are liquids or are viscous materials of viscosity low enough to admit, a curable mixture can be prepared by combining the polyepoxide and the diheterocyclic compound of this invention and mixing them intimately together. When viscosities are too great, or either or both substances are solids, they can be warmed to temperatures approaching 75° C. or a little higher, without risk of untimely cure when the products are combined.

In order to combine intimately a polyepoxide and a diheterocyclic compound of this invention when the substances employed are in physical form that does not readily admit of mixing them, it will usually be preferred to dissolve one or both first in a volatile solvent, and to combine the solvent solution with either of the other of the reactants or with its solvent solution, and, if solvent present is objectionable, subsequently volatilize and remove solvent as by distillation. In another procedure, a known reactive viscosity lowering additive such as butyl glycidyl ether or phenyl glycidyl ether or a liquid monooxazine or monooxazoline can be added to either or both of the reactants, in any quantity necessary to reduce viscosity to the point that the diluted substances can be mixed together. In some applications the resins cured from precursors containing a reactive diluent are of inferior properties. Those skilled in the art will be able to effect the combining of the reactants according to this invention satisfactorily.

It has been noted hitherto that the difunctional or approximately difunctional products of this invention can be self-polymerized or copolymerized with polyepoxides. It follows, then, that in concentration ratios numerically remote from stoichiometric ratios, the mixture of a product of this invention with a polyepoxide yields a composition that, under suitable catalytic influence, forms a resin.

The present invention, then, comprehends mixtures of polyepoxide curable to obtain an epoxy resin with heterocyclic compound of this invention with the substances present in equivalent weights or with polyepoxide in modest excess. In such mixtures in which the polyepoxide is more abundant, the adduct of heterocycle and oxirane hitherto noted as of catalytic activity in curing an epoxide performs that function to cure the polyepoxide catalytically, with co-reaction of the instant polyheterocyclic products whereby they become integral moieties of the resulting polymer.

The instant compounds, while not well adapted to form ethylenic homopolymers, form copolymers with other ethylenic substances of wide variety. Among the comonomers that are well adapted to be used in forming ethyelnic copolymers of this invention are:

butadiene, 2,3-dimethyl-1,3-butadiene,
isoprene, piperylene,
3-furyl-1,3-butadiene,
3-methyl-1,3-butadiene,
chloro-1,3-butadiene,
2-bromo-1,3-butadiene,
2-chloro-3-methyl-1,3-butadiene,
styrene, p-chlorostyrene,
p-methoxystyrene, $\alpha$-methylstyrene,
vinylnaphthalene, acrylic acid,
methacrylic acid, methyl acrylate, ethyl acrylate,
methyl $\alpha$-chloroacrylate, methyl methacrylate,
ethyl methacrylate,
butyl methacrylate,
methyl ethacrylate, acrylonitrile,
methacrylonitrile, methacrylamide,
methyl isopropenyl ketone,
methyl vinyl ketone,
methyl vinyl ether,
vinylethinyl alkyl carbinols,
vinyl acetate, vinyl chloride,
vinylidene chloride, vinylfurane,
vinylcarbazole, N-vinyl-3-morpholinone,
vinyl formate, maleic acid,
itaconic acid, fumaric acid,
crotonic acid, allyl alcohol,
vinylfluoride, 2-chloroallyl alcohol,
1-allyloxy-3-chloro-2-propanol,
N-vinylsuccinimide,
N-tertiarybutyl acrylamide,
N-tertiaryoctyl acrylamide,
1,2-dichloropropene-2,
1,2-dichloropropene-1,
trichlorostyrene, tetrachlorostyrene,
pentachlorostyrene, o-methylstyrene,
m-methylstyrene, p-methylstyrene,
p-tertiarybutylstyrene,
p-isopropylstyrene, p-phenylstyrene,
p-benzoylstyrene, p-cyanostyrene,
m-nitrostyrene, m-trifluoromethylstyrene,
m-fluorostyrene, m-tertiarybutylstyrene,
stearoylstyrene, oleoylstyrene,
linoleoylstyrene, $\alpha$-vinylnaphthalene,
$\beta$-vinylnaphthalene,
1-($\alpha$-naphthyl)-propene-1,
2-($\alpha$-naphthyl)-propene-1,
2-($\alpha$-naphthyl)-butene-2,
3-($\alpha$-naphthyl)-pentene-2,
2-bromo-4-trifluoromethylstyrene,
$\beta$-bromo-$\alpha,\beta$-diiodostyrene,
$\beta$-bromo-p-methylstyrene,
$\beta$-bromo-p-dinitrostyrene,
m-secondarybutylstyrene,
$\alpha,\beta$-dibromostyrene, $\beta,\beta$-dibromostyrene,
$\alpha$-chloro-2,4,6-trimethylstyrene,
$\alpha$-chloro-2,3,4,6-tetramethylstyrene,
$\beta$-chloro-o-nitrostyrene,
1-chloro-2-(p-tolyl)-1-butene,
4-(1-chlorovinyl)-anisole,
2-(1-chlorovinyl)-4-methylanisole,
1-chloro-4-vinylnaphthylene,
4-(1-chlorovinyl)-2-isopropyl-5-methylanisole,
4-(2-chlorovinyl)-2-isopropyl-5-methylanisole,
p-cyclohexyl styrene,
2-ethyl-1-phenyl-1-butene,
3,5-diethyl styrene,
4-fluoro-3-trifluoromethyl-$\alpha$-methyl-styrene,
$\alpha,\alpha$-trifluoro-m-propenyl-toluene,
2-isopropyl-5-methyl-4-vinyl anisole,
2-methyl-3-phenyl-2-pentene,
methyl styryl ether,
N,N-dimethyl-m-vinylaniline,
2-($\alpha$-naphthyl)-2-butene,
1,1-diphenyl-ethylene, propenyl benzene,
stilbene, 1-vinylacenaphthene,
p-vinylbenzonitrile, p-vinylbiphenyl,
2-vinylfluorene, 6-vinyl-1,2,3,4-tetrahydro-naphthalene,
p-vinylphenetole, vinylbutyrate,
vinylbenzoate, vinylquinoline,
2-vinylpyridine, 2-methyl-5-vinylpyridine,
4-vinylpyridine, N,N-diallylacrylamide,
diallylamine, diallylmethacrylamide,
2,5-dimethyl-3,4-dihydroxy-1,5-hexadiene,
2,5-dimethyl-2,4-hexadiene, divinylbenzene,
divinyl ester of diethylene glycol,
trivinyl benzene, 2,7-dimethyl-1,7-octadiene,
1,7-octadiene, p-diisopropenylbenzene,
1,3,5-triisopropenylbenzene,
p,p'-diisopropenyldiphenyl,
1,1,3,3-tetrallyl-1,3-propanediol,
1,1,3,3-tetramethallyl-1,3-propanediol,
4,6-dimethyl-4,6-dihydroxy-1,8-nonadiene,
2,4,6,8-tetramethyl-4,6-dihydroxy-1,8-nonadiene,
nonadiene-1,8,
2,8-dimethylnonadiene-1,8,
acetyl triallyl citrate, ethylene,
propylene, and maleic anhydride.

The polymers are typically of K-values according to Fikentscher of from about 2 to about 200.

The preparation of such polymer is relatively routine in the art of producing ethylenic polymers; it is favoured by such free-radical catalysts as 2,2'-azobis (2-methylpropionitrile) (sometimes abbreviated AIBN) or the organic peroxides. The polymers manifest the properties characteristic of the ethylenic non-polymer precursor compounds in that, after ethylenic copolymerization, they are very active curing agents for polyepoxide to obtain epoxy resins in the structure of which the copolymeric backbone becomes a major constituent, the cured resins characterized by dense cross linking arising from the polyoxazoline or oxazine structure of the curing agent.

Also, in fashion very similar to that of the non-polymerized alkenylbisoxazoline or oxazine structures, via the oxazine or oxazoline moieties, the instant ethylenic copolymers form interpolymers with hydrogen sulfide or with polythiols.

The preparation of such interpolymer may be carried forward to only partial consumption of the oxazine or oxazoline groups, such as a third to a half of them, and those remaining are capable yet of curing a polyepoxide to obtain an epoxy resin which, under these circumstances may, in the cured form, be regarded as a further interpolymer.

A polythiol to be employed is a compound of the formula

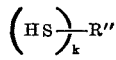

wherein R" is of the scope of R', as defined above, or can additionally be cycloalkylene of from 4 to 7, both inclusive, carbon atoms or substituted cycloalkylene of from 5 to 12, both inclusive, carbon atoms, or phenyl, and $k$ is from $>1$ to all available substitutent sites on R", and typically 2.

Hydrogen sulfide, while not a dithiol, is a compound that presents more than one hydrogen atom each active and each bound to sulfur; and these are the characteristics of a compound that will react as comonomer in this invention. Hydrogen sulfide, therefore, is a comonomer to be used as are the dithiol compounds.

As noted hereinbefore, when either the thiol or oxazoline comonomer is employed in excess, the excess provides chain-terminating mercapto or oxazoline moieties. From the reactivity of such terminal groups, the copolymers of this invention thus produced can be used to react with 1,2-polyloweralkylepoxide compounds that are curable to obtain epoxy resins; and by such expedient there is produced a product of this invention that is a copolymer of the diothiol-oxazoline type modified by containing also epoxy resin moieties.

The relative amount of thiol compound or bisoxazoline compound for such epoxy resin copolymers can be varied from that equimolecular with the dithiol compound to an amount which, with respect to the conventional polymer formula, can be expressed as $y+n$ when $0<n<2$.

As is usually true in the polymer art, the value of $y$ is known only as an average value with a range of deviations; but the exact determination of these matters is not critical so long as the products of the resulting polymer are satisfactory for their purpose. In general, values of $y$ will usually lie in the range of from about 30 to a few thousand, perhaps four or five thousand, and typically in the range of from about 50 to 250. Values in these ranges can be used for guidance in conducting simple range finding tests to fix a precise value of $n$ to obtain a polymer product of any desired range of properties.

Illustrative of the polythiols to be used in this invention are:

methanonedithiol;
1,1-propanedithiol;
1,1-dimercaptoisooctane;
2,2-propanedithiol;
3,3-pentanedithiol;
α,α-toluenedithiol;
1,2-ethanedithiol;
trimethylene-1,3-dithiol;
1,2-propanedithiol;
1,4-tetramethylenedithiol;
2,3-butanedithiol;
1,5-pentamethylenedithiol;
2,2-dimethylpropanedithiol-1,3;
1,6-hexamethylenedithiol;
1,2-hexanedithiol;
α,α-decamethylenedithiol;
2,6-dimethyloctanedithiol-3,7;
2,6-dimethyloctanedithiol-2,6;
pentadecanedithiol-7,8;
octadecamethylene α,α-dithiol;
1,2-cyclohexanedithiol;
1,1-bis(mercaptomethyl)cyclohexane;
3,4-thiophenedithiol;
propanetrithiol-1,2,3;
neopentanetetrathiol;
dithiocatechol;
dithioresorcinol;
dithiohydroquinone;
4,5-dimethyldithioresorcinol;
2,4-dimethyldithioresorcinol;
4-ethyldithioresorcinol;
2,5-dichlorodithioresorcinol;
1,4-naphthalenedithiol;
1,5-naphthalenedithiol;
2,6-naphthalenedithiol;
2,7-naphthalenedithiol;
2,2'-dimercaptobiphenyl; and
4,4'-dimercaptobiphenyl.

A polyepoxide comonomer to be employed in this invention is a compound of the general formula

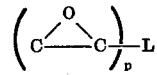

wherein $1<p$ and L is a polyepoxide nucleus structure. Typical such nuclei as of the above formula include (isopropylidenebis(phenyleneoxymethylene)) or its polybrominated derivatives, such as the 1 to 4 brominated derivatives. Also ω-(methylenyloxy)phenyl poly(((methylenyloxy)phenylene)methylene) among other routine and well known structures in the art of polyepoxides that are curable to obtain epoxy resins. In particular, any curable poly-1,2-epoxide that is an article of commerce and that is, or can readily be rendered, a liquid, is to be employed.

When desired, the polyoxazine or polyoxazoline-polythiol mixture can be heated and copolymerized only partially, to obtain an intermediate material of average molecular weight severalfold greater than that of the starting materials but yet relatively reactive with polyepoxides in further polymerization reactions. This material can be held for useful intervals of time after preparation and before use. It can be regarded as a "prepolymer."

Such prepolymer can be employed in various ways.

By itself it can be modified as by the addition of fillers, coloring materials, opacifying or reflective materials, and the like, and then, by further heating at a reaction temperature, fully polymerized with capture of the additives within the resulting polymeric mass.

In another embodiment, it can be mixed and blended with a polyepoxide that is curable to obtain an epoxy resin, and the resulting mixture heated to cure to obtain a useful interpolymeric resin of recurring moieties derived from the indicated starting materials. The exact properties of the resulting cured resins depend upon the relative abundance of starting materials, and also upon details of cure cycle observed.

The starting materials can be employed in any ratio of relative abundance in such polyoxazoline-polythiol-polyepoxide mixture, provided that neither polythiol nor polyoxazoline is supplied in amount less than ten percent by equivalent weight of total mixture. Ratio of polyepoxide can also vary widely provided that not more than 75 percent of total mixture, by equivalent weight, is such polyepoxide.

In general, such interpolymers of larger polyepoxide content tend to be cross-linked and thermosetting, and thus insoluble and infusible; whilst those of very low polyepoxide content or none tend to be fusible and of at least limited solubility.

In general those in which prepolymerization was limited and the prepolymer units relatively small, other things being equal, tend to yield more highly crosslinked epoxy interpolymers; whilst those in which prepolymerization was extensive and the polythiol-polyoxazoline prepolymer units relatively large tend to yield less highly cross-linked epoxy terpolymer products.

By the application of the foregoing aspects of rationale, polymer chemists can greatly reduce any necessary simple range-finding tests required to perfect a desired embodiment of this invention.

While all the compounds thus comprehended are comonomers to be used in this invention, those of simpler molecular structure will, in general, be preferred, as being easier and less expensive to produce.

In the choice of monomers with respect to the synthesis of a polymer, a mixture of substances within the generic statement above but of dissimilar identities may be chosen, to obtain a product representing properties representing the polymer derived from such monomer mixture.

In the polymerization of the instant polythiol copolymerizable mixture of comonomers, the oxazine or oxazoline undergoes ring opening between the oxygen and the carbon atom in position number five in the oxazolies; that is, the carbon atom adjacent the ring oxygen and separated by another ring carbon atom from the ring nitrogen. As the nitrogen accepts hydrogen from the copolymerizing mercapto group, the formerly doubled bond between nitrogen and the carbon atom in position number two, that is, the carbon atom between the oxygen and the nitrogen, breaks and remains as a single bond; the available valences then being used to bind the hydrogen, mentioned, and to bind the oxygen in a carbonyl group whereby an amide linkage is formed. The sulfur from which mercapto hydrogen has gone to the nitrogen then bonds with the number five carbon atom by the valence left upon ring opening.

The chain thus propagating can, if deired, be terminated predominantly with either oxazoline groups that have not undergone ring-opening, or with mercapto groups that have not been split, by the simple expedient of supplying either reactant, as desired, in slight excess over equivalent. If the reactants are supplied in exact stoichiometric amount, the chains tend to be terminated by the indicated groups; but with no quantitative predominance of one over the other.

The polythiol polymers of this invention, then, are represented by the generic structure

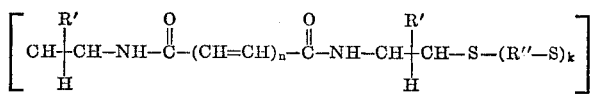

These polymeric products, when in liquid form, are adapted to be used as curing agents to cure polyepoxides to obtain epoxy resins The mechanism by which such cure of epoxy resins is accomplished is not known; but a polymer of this invention may be used in admixture with such polyepoxide in quantities from 10 percent to 90 percent of either material, by weight of total mixture; and the resulting mixture undergoes some chemical reactive process that is not completely understood by which the polyepoxide cures; and each of the polyepoxide and the polymer of this invention loses its individual identity in the resulting modified epoxy resin.

The epoxy resins thus cured have the properties of typical cured epoxy resins, including adhesivity, hardness, and mechanical strength; those of higher content of the linear poly-secondary amides of this invention tend to manifest the modification of properties towards those of the unmodified polyamides; those of higher polyepoxide derivative content tend to manifest modification of properties towards those of the unmodified epoxy resins.

The resulting resins appear to be highly cross-linked and of excellent mechanical, thermal, and electrical properties, and of excellent resistance to solvent attach, ultraviolet degradation and corrosion of metal substrates.

BEST MODES OF PRACTICING THE INVENTION

Preparation of Illustrative 2,2'-alkylene-bis-2-oxazoline monomers

EXAMPLE 1

2,2'-(vinylene bis)-2-oxazoline

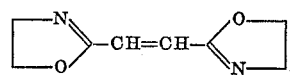

A solution of 73.1 grams (1.7 gram mole) aziridine in 100 milliliters-dichloromethane is added, by drops, and with stirring, and with chilling to a temperature not above 20° C., to a solution of 112.3 grams (0.735 gram mole) fumaryl chloride. Upon completion of the addition, the resulting reaction mixture is stirred for 1.5 hours at room temperature. As a result of these procedures there is obtained an insoluble precipitate of N,N'-bis-(2-chloroethyl)fumaramide, the structure of which is confirmed by infrared and nuclear magnetic resonance spectrum.

Of this fumaramide, 175 grams (0.735 gram mole) is added to and mixed with a solution of 34.1 grams, 1.68 gram mole, of potassium hydroxide in 30 milliliters 95% ethanol. The resulting reaction mixture is then refluxed for 5 hours and filtered hot to remove potassium chloride of reaction. The resulting filtrate is warmed to vapourize and remove portions of solvent. Thereupon, from remaining portions of solvent a white, crystalline precipitate settles out of solution. The crystalline precipitate is separated out with no attempt to scrub for maximum yield. The product proves to be 80 grams of a white, crystalline material, 48% of theoretical yield. The product 2,2'-(vinylene bis)-2-oxazoline melts at 186–189° C.

EXAMPLE 2

In procedures much like those foregoing but using 2-methylaziridine, a methyloxazoline product is obtained.

In more detail, a solution of 91.2 grams, 1.6 gram moles, of 2-methylaziridine in 100 milliliters dichloromethane is added by drops, with stirring, and with chilling to a temperature not above 25° C., to a solution of 115.3 grams, 0.754 mole, fumaryl chloride in 280 milliliters dichloromethane. The resulting mixture is stirred at room temperature for 1.5 hours, during which time a crystalline product is formed in, and settles out of the reaction mixture. Product is recovered by filtration, washed with dichloromethane and dried over a suction funnel filter. In an attempt to ascertain a melting temperature, this intermediate substance (N,N'-bis-(2-chloropropyl)fumaramide) decomposes to a red liquid at 215–220° C.

Of this intermediate, 200 grams, 0.75 gram moles, is added in one portion to a solution of 90 grams potassium hydroxide in 300 milliliters of 95 percent ethanol. The resulting reaction mixture is refluxed for two hours and thereafter filtered hot. From the liquid filtrate, part of the solvent is vapourized and removed to concentrate the filtrate; and from it, a crude product precipitates. Yield is 94.7 gram, 49% by weight of starting materials. Product is taken up in and recrystallized from n-hexane to yield a crystalline product in the form of white needles, melting in the range of 50–64° C. The assigned structure is confirmed by infrared spectrum and nuclear magnetic resonance spectrum.

EXAMPLE 3

2,2'-(1,3-Butadienylenebis)-2-oxazoline

This example presents the first of two which, in turn, are selected from a larger number of) processes for production of the subject compound. In this method, a muconamide is prepared, and cyclized.

Into a 250 milliliter Erlenmeyer flask, with stirring and chilling to a temperature not above 15° C., is placed a solution of 1.40 grams 0.0078 gram mole) muconyl chloride dissolved in 15 milliliters chloroform. To this, with vigorous stirring, is added a solution of 0.67 gram (0.0156 gram mole) aziridine in 30 milliliters chloroform, during a period of 10 minutes. Upon completion of the addition, the resulting reaction mixture is allowed to stand, with continued stirring, at room temperature for an hour. In the reaction mixture, an off-white solid forms and settles out as a precipitate. It is separated by filtration and weighed; it is found to weigh 1.8 grams, 86.7 percent of theory based upon starting materials. Its structure is confirmed by infrared spectrum. Recrystallized from ethanol, it produces white crystals melting at 218–220° C. This is N,N'-bis-(2-chloroethyl)muconamide, an intermediate to the product of this example.

This intermediate (1.32 grams, 0.005 gram mole) is charged into a 250 milliliter Erlenmeyer flash which contains also 30 milliliters of a solution of 0.40 gram (0.010 gram mole) of sodium hydroxide in 95 percent ethanol. The resulting mixture is heated on a steam bath at reflux temperature for 25 mixtures, by which time a layer of crystalline material forms and settles to the bottom of the flask. The mixture is filtered hot, and from the filtrate, well-defined white crystalline plates settle out as the filtrate cools.

The filtrate is allowed to stand in a negative pressure hood to evaporate to dryness. Light yellow plate crystals form in the bottom of the vessel. The plates are washed with cold water and alowed to dry, and found to weigh 0.95 gram, 98 percent of theory.

Not only does the infrared spectrum confirm the structure, but also it proves to be identical with the spectrum of product produced according to the next example following.

EXAMPLE 4

In this example, a muconylbisaziridine is formed and isomerized.

Into a 125 milliliter Erlenmeyer flask, with chilling and stirring, are charged 100 milliliters dry benzene, 2.2 grams (0.2 gram mole) triethylamine, and 0.86 gram aziridine (0.82 gram mole) and, at 0–5° C., the resulting mixture is vigorously stirred while 1.8 grams (0.1 gram mole) muconyl chloride in 15 milliliters dry benzene are added. The addition is made by drops and over a period of 30 minutes: during this time temperature is held to 8° C. or below.

In course of the reaction, triethylamine hydrochloride forms in the reaction mixture and settles out as a precipitate, rendering stirring difficult. Following the completion of the combining of the reactants, stirring over the ice bath is continued for 2 hours further to carry the reaction to completion.

Thereafter, the mixture is filtered to separate the amine salt. Filtrate is placed in a negative pressure hood and permitted to evaporate to dryness in the hood draft; the resulting product proves to be a white-tan material weighing 2.58 grams, a crude yield of 67 percent of theory. The crude product melts at 104–108° C. It is taken up in, and recrystallized from isopropanol, and the recrystallized product melts at 110–112° C. A published melting temperature for the product is 110° C.

Of this bis-(1,1'-muconyl)-aziridine, 0.2281 gram (0.0013 gram mole) is added in one portion to a solution of 1.5214 grams reagent grade sodium iodide in 50 milliliters dry acetone, in a 100 milliliter Florence flask. The resulting mixture is boiled under reflux for 21.5 hours to isomerize it, and thereafter filtered hot to separate an unidentified dark, insoluble material. Acetone is allowed to evaporate in draft of a negative pressure hood; and the resulting light yellow plates are thereafter washed with repeated 10 milliliter portions of cold water to obtain 0.1744 gram (76.5 percent by weight of starting materials) of a bis-2,2'-(1,3-butadienylene)-2-oxazoline product. The product melts at 223–226° C. Infrared and nuclear magnetic resonance spectra confirm the expected structure.

EXAMPLE 5

This example illustrates the cure of a polyepoxide by the products of this invention; the curing is correctly regarded also as a copolymerization.

Illustrative of the compounds of the instant invention, 2,2'-(vinylenebis)-2-oxazoline, products of Example 1, foregoing, is chosen; and the polyepoxide is a widely used commercial product, substantially the diglycidyl ether of bisphenol A.

Of the oxazoline product, 3.52 grams are finely powdered, and the fine powder intimately mixed and stirred into a stoichiometric amount (7.6 grams) of the viscous, liquid polyepoxide. The resulting mixture is heated in a glass vial at 150° C. for an hour and thereafter the vial is broken away. The resulting copolymeric product is found to be a homogeneous, tough, hard, strong, amber coloured resin, insoluble in common solvents and believed to be insoluble in all solvents. It is singularly resistant to ultraviolet light degradation and exerts unusual protection from corrosion upon metals coateed with it.

I claim:

1. A polymeric material composed of repeating units of the formula $$\left[ \begin{array}{c} R' \\ CH-CH-NH-\overset{O}{\underset{\|}{C}}-(CH=CH)_n-\overset{O}{\underset{\|}{C}}-NH-CH-CH-S-(R''-S)_k \\ H \end{array} \right]$$

where R' is hydrogen or alkyl of from 1 to 4 carbon atoms, n is an integer from 1 to 3, R'' is of the scope of R' or cycloalkylene of from 4 to 7 carbon atoms or substituted cycloalkylene of from 5 to 12 carbon atoms or phenyl, and k is an integer greater than 1.

References Cited

UNITED STATES PATENTS

| | | |
|---|---|---|
| 3,563,920 | 2/1971 | Tomalia et al. _____ 260—2 |
| 3,630,996 | 12/1971 | Tomalia _____ 260—47 EN |
| 3,639,395 | 2/1972 | Tomalia _____ 260—240 E |

DONALD E. CZAJA, Primary Examiner

M. I. MARQUIS, Assistant Examiner

U.S. Cl. X.R.

117—127; 260—2 EC, 47 EC, 78 UA, 79.1, 609 C, 830 S, 830